UNITED STATES PATENT OFFICE.

PAUL NAWIASKY, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE DYES AND PROCESS OF MAKING THEM.

1,062,990. Specification of Letters Patent. Patented May 27, 1913.

No Drawing. Application filed March 30, 1912. Serial No. 687,462.

*To all whom it may concern:*

Be it known that I, PAUL NAWIASKY, subject of the Emperor of Austria-Hungary, residing at Ludwigshafen - on - the - Rhine, Germany, have invented new and useful Improvements in Anthraquinone Dyes and Processes of Making Them, of which the following is a specification.

I have discovered a new class of coloring matters of the anthraquinone series which I regard as sulfonic acid derivatives of anthraquinone-aryl-thio-ethers. These new coloring matters can be obtained by treating an anthraquinone-aryl-thio-ether with a sulfonating agent, or by condensing an anthraquinone sulfonic acid which also contains one or more reactive substituents with an aryl-mercaptan, so that the product obtained contains at least one sulfonic acid group. The anthraquinone-aryl-thio-ethers may also contain one or more than one auxochrome group or indifferent group. Anthraquinone-aryl-thio-ethers containing one or more than one auxochrome group can be produced by reacting with an aryl-mercaptan on a negatively substituted anthraquinone which contains, in addition to the negative group, one or more than one auxochrome group, such for instance as $OR_1$ and $NR_1R_2$, where $R_1$ and $R_2$ represent either hydrogen, or alkyl, or aryl. My new coloring matters are characterized by being soluble in water and in concentrated sulfuric acid and by dyeing wool from an acid bath various shades. Their alkaline solutions are colored and assume a different color on being treated with sodium hydrosulfite. In the form of their neutral potassium salts, which can be obtained by precipitating the neutral solution with potassium chlorid, they possess more atomic proportions of sulfur than of potassium. The color of their aqueous solutions is destroyed by alkaline hypochlorite.

The following examples will serve to illustrate further the nature of my invention and also the production of some new anthraquinone-aryl-thio-ethers, but the invention is not limited to these examples. The parts are by weight.

Example 1: Dissolve 13 parts of potassium hydrate in 1500 parts of alcohol and add 54 parts of 1-oxy-2-methyl-4-chloranthraquinone and 25 parts of thioparacresol, and boil the mixture in a reflux apparatus on the water-bath until a test portion shows that the reaction is practically finished. Allow the mass to cool and filter off the product and wash it with alcohol and water and dry it. It is a violet crystalline powder which yields a red solution in organic solvents and a green-blue solution in concentrated sulfuric acid. It is insoluble in water. It probably possesses a constitution corresponding to the formula:

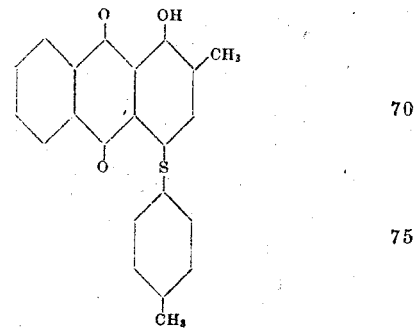

Example 2: Dissolve 26 parts of potassium hydrate in 1500 parts of alcohol and add 64 parts of 1-amino-2-brom-4-oxyanthraquinone and 25 parts of para-thiocresol. Boil the mixture for 12 hours on the water-bath and work up the product as described in the foregoing example. In this way 1-amino - 4 - oxyanthraquinone - 2 - paracresyl-thio-ether is obtained in brown-violet, glittering needles which yield blue-red solutions in organic solvents and a yellow-red solution in concentrated sulfuric acid.

Example 3: Dissolve 31 parts of potassium hydrate in 2,000 parts of alcohol and add 136 parts of 1-amino-2-methyl-4-chloranthraquinone and 63 parts of parathiocresol, and proceed as described in the foregoing Example 1. The new compound is obtained as a brown-red glittering crystalline powder which yields blue-red solutions in organic solvents and a blue solution in concentrated sulfuric acid. It is insoluble in water.

Example 4: Work up a mixture of 25 parts of potassium hydrate, 2,000 parts of alcohol, 95 parts of 1-methyl-amino-4-brom-anthraquinone and 40 parts of parathiocresol as described in the foregoing Example 1; 1-methyl-amino-anthraquinone-4-parathiocresyl ether is obtained in the form of violet glittering needles which yield violet-red solutions in organic solvents and reddish shades of blue in concentrated sulfuric acid.

Example 5: Condense together in the manner described in the foregoing Example 1, in the presence of 13 parts of potassium hydrate, and 1,000 parts of alcohol, 51 parts of 1-chlor-2-amino-anthraquinone and 25 parts of parathiocresol. The reaction product consists of an orange crystalline powder which yields orange solutions in organic solvents and a yellowish brown solution in concentrated sulfuric acid.

Example 6: Condense together, in the manner described in the foregoing Example 1, in the presence of 26 parts of potassium hydrate, and 1500 parts of alcohol, 60 parts of 1.4-diamino-2.3-dichlor-anthraquinone and 50 parts of para-thiocresol; 1.4-diamino-anthraquinone-2.3-diparacresyl-thio-ether is obtained as blue needles which yield brown-yellow solutions in concentrated sulfuric acid and solutions of greenish shades of blue in organic solvents.

Example 7: Prepare the condensation product from 35 parts of potassium hydrate, 2,500 parts of alcohol, 70 parts of parathiocresol and 95 parts of 1.3-dibrom-2-amino-anthraquinone in the manner described in the foregoing Example 1; 2-amino-anthraquinone-1.3-diparacresyl-thio-ether is obtained in the form of orange needles which yield a red-violet solution in concentrated sulfuric acid and orange-yellow solutions in organic solvents. In a similar manner, other aryl-mercaptans and other anthraquinone derivatives containing auxochrome groups can be employed. It probably possesses a constitution corresponding to the formula:

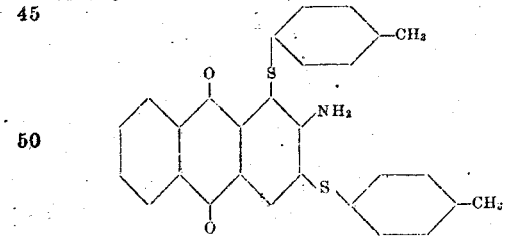

Example 8: Introduce, while stirring, ten parts of anthraquinone-1-paracresyl-thio-ether into 30 parts of sulfuric acid monohydrate at a temperature of from 20° to 25° C. After some time pour the reaction mixture into 200 parts of water and complete the precipitation of the sulfoacid by the addition of common salt solution. The coloring matter is a lemon yellow powder which yields a yellow solution in water and a blue solution in concentrated sulfuric acid. It dyes wool from an acid bath pure yellow shades of excellent fastness against the action of light.

Example 9: Introduce, while stirring, 10 parts of anthraquinone-2-paracresyl-thio-ether (obtainable from 2-chlor-anthraquinone) into 30 parts of sulfuric acid monohydrate at from 20° to 25° C. The sulfonation is complete in a short time, then work up the product as described in the foregoing Example 8. The sulfonic acid of anthraquinone-2-paracresyl-thio-ether is obtained as a lemon yellow powder which yields a light yellow solution in water and a red-violet solution in concentrated sulfuric acid. It dyes wool clear lemon yellow.

Example 10: Sulfonate 10 parts of anthraquinone-1.5-diparacresyl-thio-ether in the manner described in the foregoing Example 8. The sulfonic acid yields a yellow solution in water and solutions of greenish shades of blue in concentrated sulfuric acid. It dyes wool bright orange-yellow shades. The coloring matter obtainable by sulfonating anthraquinone-1.8-diparacresyl-thio-ether differs little from the above described sulfonic acid. It dyes somewhat more reddish shades of yellow.

Example 11: Introduce 10 parts of anthraquinone-1.4-diparacresyl-thio-ether into 30 parts of sulfuric acid monohydrate, while stirring, and heat for 12 hours at from 40° to 50° C. Work up the product as described in the foregoing Example 8, whereupon a scarlet red powder is obtained which yields a bright red solution in water and a green solution in concentrated sulfuric acid. It dyes wool from an acid bath bright yellow-red.

Example 12: Introduce 10 parts of 1-oxy-2-methyl-anthraquinone-4-paracresyl-thio-ether, while stirring, into 300 parts of sulfuric acid monohydrate and heat at from 40° to 50° C. until a test portion introduced into water gives a clear solution on being heated. Pour the reaction mixture into 2,000 parts of water and salt out the coloring matter with common salt solution. It is a red powder which yields a red solution in water and solutions of greenish shades of blue in concentrated sulfuric acid. It dyes wool from an acid bath red shades.

Example 13: Introduce 10 parts of 2-amino-anthraquinone-1-paracresyl-thio-ether, while stirring, into 300 parts of sulfuric acid monohydrate and proceed as described in the foregoing Example 12. The sulfonic acid consists of an orange-red powder which yields an orange solution in water, an olive-green solution in concentrated sulfuric acid, and dyes wool orange from an acid bath.

Example 14: Introduce 10 parts of 1-methyl-amino-anthraquinone-4-paracresyl-thio-ether, while stirring, into 300 parts of sulfuric acid monohydrate and allow the mass to stand for several hours at from 20° to 25° C. When the sulfonation is complete, pour the mass into water and work up as described in the foregoing Example 8. The coloring matter is a blue-violet powder which yields a violet solution in water, a yellow-orange solution in concentrated sulfuric acid, and dyes wool clear violet shades.

Example 15: Introduce 10 parts of 1-amino-4-oxy-anthraquinone-2-paracresyl-thio-ether, while stirring, into 300 parts of sulfuric acid monohydrate, and proceed as described in the foregoing Example 14. The sulfonic acid obtained is a violet-red powder which yields a blue-red solution in water, a reddish orange colored solution in concentrated sulfuric acid, and dyes wool red-violet.

Example 16: Sulfonate 10 parts of 1-amino-2-methyl-anthraquinone-4-paracresyl-thio-ether with 300 parts of sulfuric acid monohydrate as described in the foregoing Example 8. The sulfonic acid obtained is a blue-red powder which yields a blue-red solution in water, a red-brown solution in concentrated sulfuric acid, and dyes wool brilliant blue-red.

Example 17: Sulfonate 10 parts of 1.4-diamino-anthraquinone-2.3-dicresyl-thio-ether as described in the foregoing Example 8. The coloring matter consists of a blue powder which is very easily soluble in water with a green-blue color, and in concentrated sulfuric acid with a yellow color. It dyes wool brilliant green-blue shades.

Example 18: Introduce 2 parts of 2-amino-anthraquinone-1.3-diparacresyl-thio-ether, while stirring, into 40 parts of sulfuric acid monohydrate and maintain the mixture for 12 hours at from 35° to 40° C. Pour the product into water and salt out the sulfonic acid by means of potassium chlorid. The coloring matter is an orange powder which yields an orange colored solution in water, a yellow-red solution in concentrated sulfuric acid, and dyes wool orange from an acid bath.

Example 19: Heat together, on the water-bath, for 10 hours, at from 80° to 90° C., 10 parts of 1.4-dichlor-anthraquinone-6-sulfonic acid, 25 parts of caustic soda solution (of 24%), 6.5 parts of para-thiocresol and 400 parts of water. At the end of this time a part of the new sulfonic acid will have separated out. Add hot water until a solution is obtained, filter while hot, allow to cool and then salt out with common salt. Filter off and press the coloring matter, which consists of a yellow-red powder which yields an orange colored solution in water and a blue solution in concentrated sulfuric acid. It dyes wool reddish orange shades from an acid bath.

Example 20: Heat together for 12 hours, on the water-bath, 6.3 parts of the potassium salt of 1.5-diamino-4.8-dibrom-anthraquinone-2.6-disulfonic acid, 4 parts of 24% caustic soda solution, 3 parts of thioparacresol and 100 parts of water. Then allow the mixture to cool, filter off the coloring matter and wash it with cold water until the filtrate is pure blue. The coloring matter is a crystalline powder with a metallic luster. It yields a pure blue solution in water, a blue-red solution in concentrated sulfuric acid, and dyes wool pure blue shades.

Now what I claim is:—

1. The process of producing coloring matters of the anthraquinone series by treating an anthraquinone-aryl-thio-ether with a sulfonating agent.

2. The process of producing coloring matter of the anthraquinone series by treating 2-amino-anthraquinone-1.3-di paracresyl-thio-ether with a sulfonating agent.

3. As new articles of manufacture the coloring matters which are probably sulfonic acid derivatives of anthraquinone-aryl-thio-ethers which are soluble in water and in concentrated sulfuric acid and which dye wool from an acid bath various shades, which new coloring matters yield alkaline solutions which are colored and which assume a different color on being treated with sodium hydrosulfite, which new coloring matters in the form of their neutral potassium salts possess more atomic proportions of sulfur than of potassium, while the color of their aqueous solutions is destroyed by alkaline hypochlorite.

4. As a new article of manufacture the coloring matter being probably a sulfonated derivative of 2-amino-anthraquinone-1.3-diparacresyl-thio-ether, which coloring matter consists of an orange powder which yields an orange solution in water, a yellow-red solution in concentrated sulfuric acid, dyes wool orange from an acid bath, yields a colored alkaline solution which solution assumes a different color on being treated with sodium hydrosulfite, which new coloring matter in the form of its neutral potassium salt possesses more atomic proportions of sulfur than of potassium, while the color of its aqueous solution is destroyed by alkaline hypochlorite.

In testimony whereof I have hereunto set my hand in the presence of two subscribing witnesses.

PAUL NAWIASKY.

Witnesses:
J. ALEC. LLOYD,
JOS. PFEIFFER.